(12) United States Patent
Percec et al.

(10) Patent No.: US 6,437,044 B1
(45) Date of Patent: Aug. 20, 2002

(54) LIVING RADICAL GRAFT COPOLYMERIZATION OF VINYL MONOMERS INITIATED FROM THE STRUCTURAL DEFECTS OF POLYVINYLCHLORIDE

(75) Inventors: Virgil Percec; Firouz Asgarzadeh, both of Philadelphia, PA (US)

(73) Assignee: University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/770,141

(22) Filed: Jan. 26, 2001

(51) Int. Cl.[7] .............................. C08F 4/00; C08F 259/04
(52) U.S. Cl. ..................... 525/104; 525/144; 525/243; 525/245; 525/292; 525/317; 525/331.5; 525/333.4; 526/343; 526/344; 526/347
(58) Field of Search .................................. 525/104, 144, 525/292, 317, 331.5, 333.4, 243, 245; 526/343, 344, 347

(56) References Cited

U.S. PATENT DOCUMENTS 3,959,550 A * 5/1976 Guillod et al. ............... 428/220
6,248,837 B1 * 6/2001 Chung et al. ................ 525/245
6,284,850 B1 * 9/2001 Percec ......................... 526/146

* cited by examiner

*Primary Examiner*—James J. Seidleck
*Assistant Examiner*—Olga Asinovsky
(74) *Attorney, Agent, or Firm*—Michele M. Tyrpak; Hudak & Shunk Co., L.P.A.

(57) ABSTRACT

A graft copolymer composition and the preparation of the composition by living radical polymerization is disclosed. The polymerization reaction can be initiated at active chlorine sites on the poly(vinyl chloride) backbone in conjunction with a transition metal catalyst and an optional ligand. The graft copolymers are useful as, among others, compatibilizers for blends and alloys, as high heat distortion temperature poly(vinyl chloride) materials, as impact modifiers, and permanently plasticized materials.

43 Claims, 5 Drawing Sheets

LIVING RADICAL GRAFT COPOLYMERIZATION OF VINYL MONOMERS INITIATED FROM THE STRUCTURAL DEFECTS OF POLYVINYLCHLORIDE

BACKGROUND OF THE INVENTION

1. Field of the Invention

The present invention relates to graft copolymer compositions of various polymerizable monomers from poly(vinyl chloride) (PVC) obtained by living radical polymerization. It is postulated that the polymerization utilizes inherent structural defects present in PVC as the initiation sites for the polymerization reaction.

2. Description of the Prior Art

Graft and block copolymers have interesting properties due to the interaction between segments belonging to the same or different polymer molecules and have found many applications in the field of polymer chemistry and materials. Well defined grafting from poly(vinyl chloride) (PVC) has been limited, in the past, to ionic polymerization systems. For example see: Anionic Grafting Reactions, Gallot, Remp, Parrod, *J. of Polymer Science* 1, 329 (1975); Anionic Graft Copolymers. I. Poly(vinyl chloride)-g-Polystrene. Preparation and Characterization, Lechermeier, Pillot, Gole and Revillon, *J. Applied Polymer Science*, V. 19, pp. 1979–1987 (1975); Poly(vinyl chloride-g-Styrene): Synthesis, Characterization, and Physical Properties, Kennedy and Nakao, *J. Macromol. Sci.*, A12(2), pp. 197–207 (1978). While these methods provide well-defined copolymers, the reaction conditions are characteristic for ionic polymerization in that they require very low temperatures and the absence of even traces of impurity such as oxygen, humidity and functional groups both in the reaction mixture and in the structure of the monomer.

Free radical polymerization has also been used to make graft copolymers of PVC. This was performed by initiation of the polymerization of the grafting monomer by a conventional radical initiator or by radiation. For example see: Studies on Grafting Glycidyl Methacrylate on Polyvinyl Chloride Backbone, Ravve, A., Khamis, J. T., *J. Polym. Sci.*, 61, 185–194, 1962, Radiation Grafting of MMA onto PVC Films, Hegazy, El-Sayed. A.; Ebaid, A. R.; El-Sharabasy, S. A.; Mousa, A. M.; Hassan, A. Y., *J. Appl. Polym. Sci.*, 41, pp. 2941–2950, (1990). These methods, however, produce a substantial amount of non-grafted homopolymer and non-soluble gel in addition to the grafted copolymer, which must be separated by fractionation of the product in order to have only grafted material.

Living polymerization is a process leading to formation of living polymers. Living polymers are able to grow whenever additional monomer is supplied. For example see: Szwarc, M. *J. Polym. Sci.: Part A: Polym. Chem.*, 36, ix–xv, (1990). Formation of living polymers has many ramifications. Their average degree of polymerization is given by a simple relationship: $Dpn=([M]_o-[M])/[I]$ which increases linearly with conversion of monomer to polymer. The reaction is first order in monomer with a linear correlation between $Ln([M]_o/[M])$ with time. Moreover, living polymerization leads to narrow polydispersity ($Dp_w/Dp_n$) of the formed living polymer, which decreases with conversion of monomer.

During the polymerization of vinyl chloride to PVC, in addition to regular —$CH_2$ CHCl— repeat units, certain inherent structural 'defects' are produced in the polymer which result in the PVC having 'active' or 'labile' chlorines. The presence of these structural defects has been extensively studied by different methods. For example see: Branch Structures in Poly(vinyl chloride) and the Mechanism of Chain Transfer to Monomer during Vinyl Chloride Polymerization, Starnes, Jr., Schilling, Plitz, Cais, Freed, Hartless and Bovey, *Macromolecules*, 16, pp 790–807 (1 983); Intramolecular Hydrogen Transfers in Vinyl Chloride Polymerization: Routes to Doubly Branched Structures and Internal Double Bonds, Starnes, Jr., Zaikov, Chung, Wojciechowski, Tran and Saylor, *Macromolecules*, 31, pp 1508–1517 (1998). Chlorine adjacent to double bonds (allylic chlorine) and chlorine on branched carbons (tertiary chlorine) are thought to be the most active or labile structural defects in the PVC.

Allyl halides have successfully initiated the metal-catalyzed living radical polymerization of styrene and methyl acrylate in the prior art, but this does not result in graft copolymers. For example see: Synthesis of Well-Defined Allyl End-Functionalized Polystyrene by Atom Transfer Radical Polymerization with an Allyl Halide Initiator, Nakagawa and Matyjaszewski, *Polymer Journal*, 30, pp138–141 (1998); How to Make Polymer Chains of Various Shapes, Compositions, and Functionalities by Atom Transfer Radical Polymerization, Gaynor and Matyjaszewski, *ACS Symp. Ser.*, 685, pp 396–417 (1997); Synthesis of ABA Triblock Copolymers via a Tandem Ring-Opening Metathesis Polymerization: Atom Transfer Radical Polymerization Approach, Bielawski, C. W.; Morita, T.; Grubbs, R. H. *Macromolecules*, 33, 678, (2000).

Metal catalyzed living radical polymerization has been utilized for preparing polymers in general. For example see: Living Radical Polymerization of Styrene Initiated by Arenesulfonyl Chlorides and $Cu^1(bpy)_nCl$, Percec and Barboiu, *Macromolecules*, 28, pp 7970–7972 (1995); Metal-Catalyzed "Living" Radical Polymerization of Styrene Initiated with Arenesulfonyl Chlorides. From Heterogeneous to Homogeneous Catalysis, Percec, Barboiu, Neumann, Ronda and Zhao, *Macromolecules*, 29, pp 3665–3668 (1996); DiSulfonyl Chlorides: A Universal Class of Initiators for Metal-Catalyzed "Living" Diradical Polymerization of Styrene(s), Methacrylates and Acrylates, Percec, Kim and Barboiu, *Macromolecules*, 30, pp 6702–6705 (1997); Scope and Limitations of Functional Sulfonyl Chlorides as Initiators for Metal-Catalyzed "Living" Radical Polymerization of Styrene and Methacrylates, Percec, Kim and Barboiu, *Macromolecules*, 30, pp. 8526–8528, (1 997); Arenesulfonyl Halides: A Universal Class of Functional Initiators for Metal-Catalyzed "Living" Radical Polymerization of Styrene(s), Methacrylates, and Acrylates, Percec, Barboiu and Kim, *J. Am. Chem. Soc.*, 120, pp. 305–316 (1998); Self-Regulated Phase Transfer of $Cu_2O$/bpy, Cu(O)/bpy, and $Cu_2O$/bpy Catalyzed "Living" Radical Polymerization Initiated with Sulfonyl Chlorides. Percec, Barboiu and van der Sluis, *Macromolecules*, 31, pp. 4053–4056 (1998); Rate Enhancement by Carboxylate Salts in the CuCl, $Cu_2O$ and Cu(O) Catalyzed "Living" Radical Polymerization of Butyl Methacrylate Initiated with Sulfonyl Chlorides, van der Sluis, Barboiu, Pesa and Percec, *Macromolecules*, 31, pp 9409–9412 (1998); Fluorocarbon-Ended Polymers: Metal Catalyzed Radical and Living Radical Polymerizations Initiated by Perfluoroalkylsulfonyl Halides, Feiring, Wonchoba, Davidson, Percec and Barboiu, *J. Polym. Sci.: Part A: Polym. Chem.*, 38, pp 3313–3335 (2000); Transition-metal-catalyzed living-radical polymerization, Sawamoto and Kamigaito, *Chemtech*, 29, pp 30–38 (1999); Controlled/"Living" Radical Polymerization. Atom Transfer Radical Polymerization in the Presence of Transition-Metal Complexes, Wang and Matyjaszewski, *J. Am. Chem. Soc.*, 117, pp 5614–5615 (1995); Iniferter Concept and Living Radical Polymerization, Otsu, *J. Polym. Sci. Part A: Polym. Chem.*, 38, 2121 (2000); From Telomerization to Living Radical Polymerization, Boutevin, *J. Polym. Sci.: Part A: Polym. Chem.*, 38, 3235 (2000); and Highly Active Iron Imidazolylidene Catalysts for Atom Transfer Radical Polymerization, Louie and Grubbs, *Chem. Commun.*, pp 1479–1480 (2000).

The use of a copolymer of vinyl chloride with vinyl chloro acetate to produce a graft copolymer by living radical polymerization has been described in Paik et. al., *Macromol. Rapid Communications*, 19, 47–52, (1998). Paik, et al teach that it is necessary to add active chlorine to the PVC by co-polymerization and the active chlorine from the vinyl chloro acetate is the initiator for the living radical graft co-polymerization. In the teaching of the instant invention, it is not necessary to undergo the difficult and expensive modification of the PVC in order to create active sites for the initiation of the living radical polymerization.

Similarly, living radical grafting from PVC has also been achieved via chemical modification of PVC by creating xanthane type initiation sites on the backbone of PVC, which act as an initiator. For example see: "Living" Free Radical Graft Copolymers I: Preparation and Properties, Wang, H. T., Harwood, H. J., Sebenik A., *Polymer Preprints*, 34(2), 582–583, (1993). Creation of these initiation sites are difficult and expensive.

SUMMARY OF THE INVENTION

To overcome the deficiencies presented by ionic polymerization systems, it is proposed, in the instant invention, to utilize living radical polymerization systems. The instant living radical polymerization is accomplished by using reversible activation and deactivation of alkyl halides by transition metal complexes.

It has now been found that the allylic and tertiary chlorine ('active chlorines') normally found in PVC, in conjunction with certain transition metal catalysts, can successfully initiate the grafting of polymerizable monomers from the PVC backbone in a living fashion. Optionally, a solvent for the polymer and a ligand to help solubilize the metal catalyst can be utilized in the preparation of the graft copolymer composition of the present invention. These graft copolymers are useful as compatibilizers for blends and alloys, as high heat distortion temperature PVC materials, as permanently plasticized PVC materials, as impact modifiers, and in many other applications apparent to those skilled in the art.

BRIEF DESCRIPTION OF THE DRAWING FIGURES

DETAILED DESCRIPTION OF THE INVENTION

Figure 1:
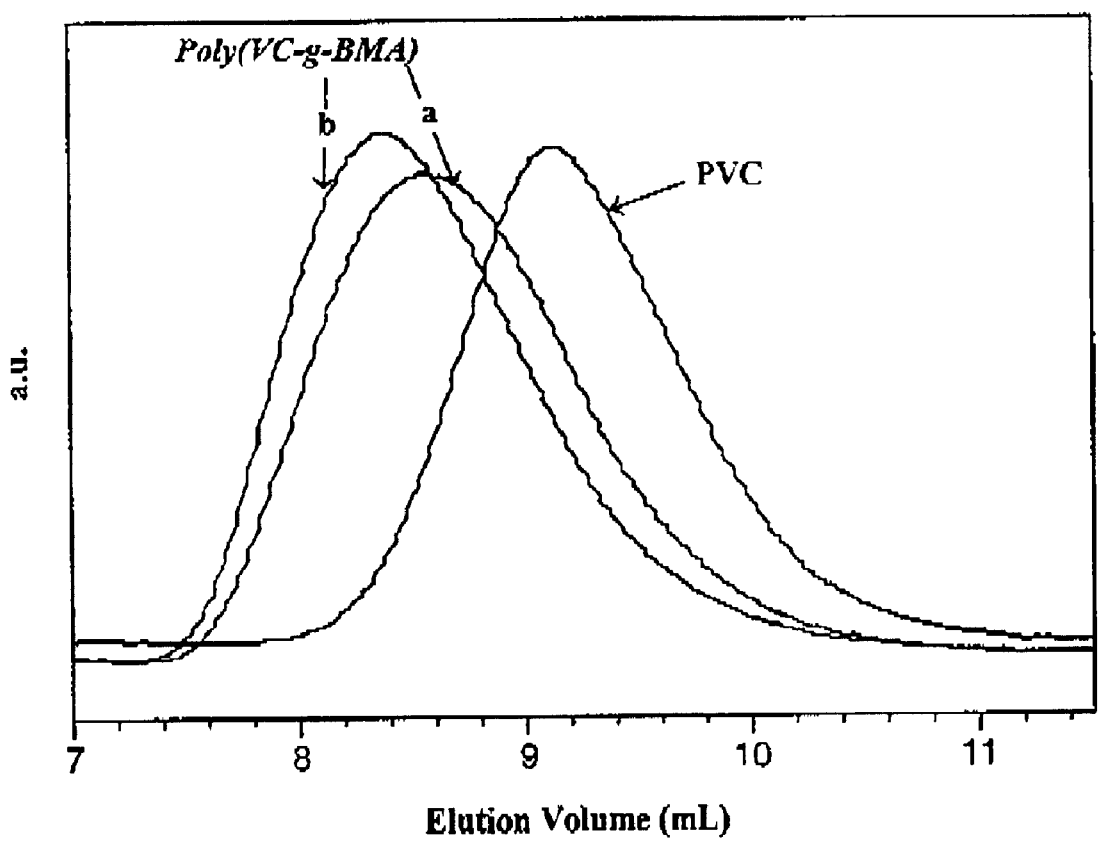
FIG. 1 is an illustration of GPC traces of PVC and of poly(VC-g-BMA) copolymers prepared by $Cu_2O$/bpy catalyzed living radical graft copolymerization; reaction conditions: (a) [BMA]/[VCru]/[$Cu_2O$][bpy]=1570/1000/17.5/52 (b) [BMA]/[VCru]/[$Cu_2O$][bpy]=3140/1000/35/106 at 120° C. in $Ph_2O$.

The poly(vinyl chloride) polymer or resin utilized in the invention is preferably a homopolymer or copolymer of vinyl chloride, or vinylidene chloride, or chlorinated PVC, or polyvinylidene chloride, or blends thereof. Hereinafter, it is to be understood that amounts of items based upon "poly(vinyl chloride)" is based upon the total amount of poly(vinyl chloride) in the homopolymer, copolymer, poly (vinyl chloride) containing blend, and the like. It is not necessary to add active chlorines to the PVC by means of copolymerization or other reactions. Generally, for the PVC utilized in the present invention, the amount of active chlorines will be at least one active chlorine per chain. A higher number of defects will lead to a more grafted material.

Where copolymers of vinyl chloride are utilized, comonomers include, but are not limited to, vinyl compounds such as vinyl acetate, vinylidene chloride, vinyl chloride, vinyl esters having a total of from 4 to about 20 carbon atoms, vinyl ethers having a total of from 3 to about 30 carbon atoms, styrene, and the like; maleic anhydrides and maleic esters; fumaric acid and esters; nitriles such as acrylonitrile; and methyl and ethyl acrylates. The proportion of comonomer used in vinyl chloride copolymers is generally from 1 to about 30 percent, and preferably from about 1 to abut 20 percent.

Polyvinyl chloride, in addition to "normal" secondary chlorines, contains labile allylic and tertiary chlorines as well. These labile chlorines with end-allylic (I), internal-allylic (II), and tertiary structure (III) wherein R is a poly (vinyl chloride) chain branch, provide active sites for the grafting of polymerizable monomers from the PVC backbone by a living radical polymerization process.

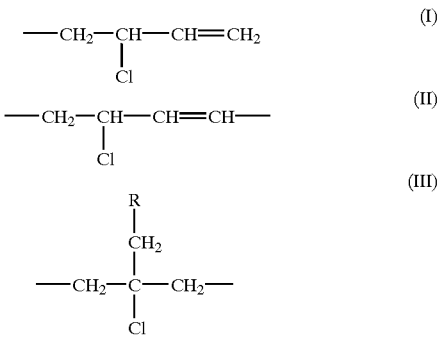

The typical PVC has from about 1 to about 5 and more often from about 2 to about 3 labile chlorine sites per 1,000 repeat units of PVC. See for example: Hjertberg, T.; Sorvik, E. M. In, *Degradation and Stabilisation of PVC*, Chapter 2, pp 21–79, (1984), and references therein.

The living radically polymerizable monomers useful for grafting, more specifically, include, but are not limited to, vinyl substituted aromatics having from about 8 to about 12 carbon atoms including styrene and substituted styrene such as, α-methyl styrene, 4-chloro-styrene, 4-methyl-styrene, and the like, or combinations thereof; nitriles, including, acrylonitrile, methacrylonitrile, and the like, or combinations thereof; (meth)acrylates, that is either an acrylate or a methacrylate having a total of from about 4 to about 20 carbon atoms with 4 to about 10 carbon atoms being preferred, including methyl acrylate, ethyl acrylate, propyl acrylate, n-pentyl acrylate, n-butyl acrylate, tert-butyl acrylate, isobutyl acrylate, 2-methyl-pentyl acrylate, n-octyl acrylate, 2-ethylhexyl acrylate, n-decyl acrylate, n-dodecyl acrylate, n-hexadecyl acrylate, n-octadecyl acrylate, and the like; methyl methacrylate, ethyl methacrylate, octyl methacrylate, isopropyl methacrylate, 2-ethylhexyl methacrylate, n-hexyl methacrylate, octadecyl methacrylate, dodecyl methacrylate, hexadecyl methacrylate, butyl methacrylate, tertiary butyl methacrylate, and the like; or combinations thereof; various functional (meth)acrylates having from about 3 to about 22 carbon atoms, such as hydroxyethyl methacrylate, glycidyl methacrylate, and the like; vinyl esters having from 4 to about 20 carbon atoms, such as vinyl acetate and the like; vinyl acetals having from 5 to about 20 carbon atoms, such as vinyl butyral and the like; or combinations of any of the above monomers. Less preferred monomers are the olefinic vinyl monomers having from about 2 to about 12 carbon atoms such as ethylene, propylene, 1,4 butadiene, and the like.

The amounts of such monomers utilized are generally from about 25 to 50,000 moles, desirably from about 50 to about 15,000 moles, and preferably from about 300 to about 3,000 moles of monomer per 1,000 repeat units of PVC. Generally, the average molecular weight of each individual graft will be from about 100 to about 6,000,000 with 100 to 100,000 being preferred.

A transition metal species is utilized to catalyze the reaction. Typical living radical forming catalysts include transition metals, as metals and/or salts thereof. Preferred salts are from Group VI or Group VII of the periodic table of elements. Examples of such catalysts include iron, cobalt, nickel, copper, ruthenium, rhodium, palladium and salts thereof, including iron chloride, iron bromide, nickel chloride, ruthenium chloride, rhodium chloride, palladium acetate, and the like. Preferably, copper will be utilized, including Cu(O), copper chloride, copper bromide, copper oxide, copper sulfide, copper selenide, and copper telluride. Cu(O) is the most reactive of the copper catalysts. For high boiling point monomers like styrene and butyl methacrylate, $Cu_2O$ is the preferred catalyst as it gives higher conversions and molecular weights than CuCl and CuBr for the same ratios of vinyl chloride/catalyst.

The amount of catalyst will be dependent on the grafting monomer selected, the number of branches desired, the active defect content of the PVC and the reaction temperature. Generally, the amount of catalyst will be from about 0.1 to about 50 moles per 1000 repeat units of PVC, desirably from about 2 moles to about 20 moles per 1000 repeat units of PVC, and preferably from about 5 to about 20 moles per 1000 repeat units of PVC.

A ligand can optionally be included in the copolymer reaction in order to aid in the solubilization of the catalyst. The specific ligand used will depend specifically and uniquely on the type of catalyst selected. For copper based catalysts, pyridines, such as 2, 2'-bi-pyridyl (bpy) and its 4,4' alkyl substituted compounds like 4, 4' di-nonyl-2,2'-bi-pyridyl (bpy-9) and combinations thereof, aliphatic and aromatic amines, including linear aliphatic amines such as terpyridyl, picolyl, multidentate amines like N,N,N,N',N'-pentamethyidiethylenetriamine (PMDETA), Tris(2-(dimethylamino)ethyl)amine (Me6-TREN), tetradentate ligands like cyclam, and combinations thereof, aryl/alkyl pyridylmethanimines such as 2-pyridinecarbaldehyde n-propylimine, n-tert-butyl-2-pyridylmethanimine, N-(1-phenylethyl)-2-pyridylmethanimine (R), and combination thereof, may be used. Other ligands include phosphines, such as triphenyl phosphines and the like. When the optional ligand is present, the polymeric mixture will usually contain from about 1 to about 15 moles of ligand per mole of catalyst, desirably from about 1 to about 5 moles of ligand per mole of catalyst, and preferably from about 2 to about 4 moles of ligand per mole of catalyst.

Polymerization of the monomers is usually carried out in the presence of a catalyst in a closed vessel in an inert atmosphere such as nitrogen, carbon dioxide, or argon; under autogenous pressure induced by the monomer and/or solvent; or artificially-induced pressure; or optionally under reflux at pressures ranging from a vacuum up to about 10,000 psi, and preferably from about 0.001 to about 2 atmosphere. The temperature of the polymerization can vary widely depending upon the type of monomer and/or catalysts but is generally from about 25° C. to about 200° C., desirably from about 60° C. to about 150° C., and preferably from about 90° C. to about 120° C.

Optionally, the poly(vinyl chloride) can be placed into solution or swelled state by using appropriate solvents such as organic fluids or mixtures of organic fluids. Naturally, solvents which do not interfere with the reaction are used and suitable solvents include ketones such as cyclohexanone, cyclopentanone, and methly ethyl ketone; benzene derivatives such as toluene, xylene, 1,2-dichlorobenzene, ethers such as diphenylether, and esters such as ethylene carbonate, dioctyl phthalate; or any of the other solvents for PVC and the copolymer known to those skilled in the art. Generally, any solvent that dissolves or swells the graft copolymer and the PVC and does not interfere with the reaction can be utilized. Enough solvent is utilized so that the graft polymer is present in solution or at least in a swollen or gel like state and such amounts generally range from about 80 to about 800, desirably from about 80 to about 500, and preferably from about 50 to about 300 parts per 100 parts by weight based on the total weight of polyvinylchloride. Where acrylonitrile and methacrylonitrile monomers are utilized, the preferred solvent is ethylene carbonate which solubilizes both PVC and the graft. Generally, however, any solvent capable of swelling the copolymer is suitable.

Alternatively, it has been found that the grafting of the PVC polymer can be carried out in the absence of solvent. Where solvent is absent, the excess monomer assists in solublizing or swelling the polymer mixture. The monomer:PVC ratio will be dependent on the desired molecular weight of the grafted material, as well as on the initial molecular weight of PVC. Generally less than 1000 parts by weight, desirably less than 800 parts by weight and preferably less than 500 parts by weight of the monomer is utilized per 100 parts by weight of the polyvinyl chloride. In such situations, the polymerization is generally carried out in bulk and the other reaction conditions set forth hereinabove are generally suitable.

The polymerizations can be either batch, semi-batch or continuous, with continuous polymerization being preferred. Normal polymerization time is from 1 minute to about 10 hours or more. Mechanical agitation is desirable but not necessary.

Subsequent to the formation of the polymer composition, solvent and residual monomer is removed, for example by evaporation, precipitation of the polymer, and the like.

As stated previously, an advantage of the polymerization process described herein is that it provides a copolymer composition generally free of non-grafted polymer contaminate, e.g., homopolymer or copolymer of the grafting monomer, which might need to be removed following polymerization. The amount of monomer reacted with poly (vinyl chloride), i.e., percent conversion, will be dependent upon the monomer utilized, the desired properties of the graft copolymer, and the end use for the graft copolymer. The percent conversion of monomer will generally at least be of from about $\geq 50\%$, $\geq 60\%$, $\geq 70\%$, or $\geq 75\%$, desirably at least about $\geq 80\%$ or $\geq 85\%$, with a percent conversion $\geq 90\%$ or about $\geq 95\%$ being preferred.

The PVC graft copolymer compositions described herein are most useful as compatibilizing agents for blends and alloys, high heat distortion temperature PVC materials, PVC with improved melt processability, as permanently plasticized PVC materials, as impact modifiers, and in many other applications apparent to those skilled in the art. When used as a compatabilizing agent, any combination of PVC and another olefin monomer can be utilized, such as polymers and copolymers made from olefins having from 2 to 8 carbon atoms, with 2 to 6 carbon atoms being preferred. The amount of PVC graft copolymer of the blend will generally be from about 5% to about 95%, desirably from about 15% to about 85%, and preferably from about 25% to about 75%. When utilized to plasticize various blends, the amount of PVC graft copolymer will generally be from about 1% to about 20% of the blend, and preferably from about 1% to about 10%.

The following examples show ways in which the invention can be practiced, as well as comparative examples. However, the examples do not limit the invention.

EXAMPLE OF PREPARATION OF THE GRAFT COPOLYMER

Appropriate amounts of PVC, catalyst, and ligand were weighed directly into a 25 ml Schlenck tube. After addition of the monomer and solvent, the tube was closed by a septum. After three freeze/vacuum pump/thaw cycles to remove low boiling or gaseous impurities, the Schlenck tube was filled with argon and the reaction mixture was heated to the desired temperature for a pre-determined time (usually 13 hours to ensure complete reaction). The obtained graft copolymer was solubilized in tetrahydrofuran (THF), and after injecting a sample of this solution into the GPC instrument, the graft copolymer was precipitated in methanol, filtered and dried in a vacuum oven at 50° C. until constant weight.

A number of graft copolymers were produced in accordance with the above copolymer preparation description. Copper(I) oxide (Alfa, 95+%), copper(II) oxide (99.995%), copper(I) sulfide (99.99%), copper (I) selenide (99.95%), and copper (I) chloride (99.995=%) were utilized as received from Aldrich Chemical. All monomers were passed through a basic $Al_2O_3$ chromatographic column. 2,2'-bipyridyl (bpy) was recrystallized from hexane. Diphenyl ether ($Ph_2O$) was distilled prior to use. PVC samples GEON27 (Mn=57,000, Mw/Mn=2.01) and GEON 110X477 (Mn=31,800, Mw/Mn= 2.1) were provided by Oxyvinyl company.

Unless otherwise noted, diphenyl ether was utilized as solvent or swelling agent, and the reaction time was about 13 hours. Percent conversion (%) represents the percent of monomer reacted with PVC. Original PVC is GEON 27. Results are reported in Table I.

TABLE I

| Exp | Monomer | Catalyst | M/VC/Cat/bpy Mol:mru:mol:mol | Temp. (° C.) | Mn | Mw/Mn | Conversion (%) |
|---|---|---|---|---|---|---|---|
| 1 | MMA | — | — | 90 | 57,000 | 2.20 | 0 |
| 2 | MMA | $Cu_2O$ | 1170:1000:4.4:11.2 | 90 | 86,000 | 2.57 | 33 |
| 3 | MMA | $Cu_2O$ | 1170:1000:8.7:26.4 | 90 | 102,000 | 2.54 | 66 |
| 4 | MMA | $Cu_2O$ | 1170:1000:17.5:52 | 90 | 121,000 | 2.45 | 78 |
| 5 | MMA | CuCl | 1170:1000:4.4:11.2 | 90 | 62,000 | 1.95 | 20 |
| 6 | MMA | CuCl | 1170:1000:8.7:26.4 | 90 | 83,000 | 1.76 | 53 |
| 7 | MMA | CuCl | 1170:1000:17.5:52 | 90 | 106,000 | 1.70 | 80 |
| 8 | MMA | CuCl | 1170:1000:17.5:52 | 90 | 100,100 | 1.75 | 82 |
| 9 | MMA | CuCl | 2900:1000:44:131 | 90 | 112,000 | 1.75 | 86 |
| 10 | MMA | CuCl | 5860:1000:87:262 | 90 | 135,000 | 1.72 | 72 |
| 11 | MMA | CuBr | 1170:1000:4.4:11.2 | 90 | 76,000 | 1.93 | 47 |
| 12 | MMA | CuBr | 1170:1000:8.7:26.4 | 90 | 99,000 | 1.80 | 76 |
| 13 | MMA | CuBr | 1170:1000:17.5:52 | 90 | 102,000 | 1.87 | 78 |
| 14 | MMA | $Cu^0$ | 1170:1000:4.4:11.2 | 120 | 115,000 | 2.46 | 82 |
| 15 | BMA | $Cu_2O$ | 800:1000:8.7:26.4 | 90 | 96,000 | 2.64 | 41 |
| 16 | BMA | CuCl | 800:1000:8.7:26.4 | 90 | 84,000 | 1.88 | 55 |
| 17 | BMA | $Cu^0$ | 800:1000:4.4:11.2 | 120 | 103,000 | 2.56 | 76 |
| 18 | BMA | CuBr | 800:1000:8.7:26.4 | 90 | 95,000 | 1.83 | 70 |
| 19 | BMA | $Cu_2O$ | 1570:1000:17.5:52 | 120 | 153,000 | 2.30 | 88 |
| 20 | BMA | $Cu_2O$ | 3140:1000:35:106 | 120 | 178,000 | 2.43 | 70 |
| 21 | t-BMA | $Cu_2O$ | 1540:1000:17.5:52 | 120 | 153,000 | 2.31 | 69 |
| 22 | t-BMA | $Cu_2O$ | 3080:1000:17.5:52 | 120 | 231,000 | 2.27 | 82 |
| 23 | t-BMA | $Cu_2O$ | 3080:1000:8.7:26.4 | 120 | 222,000 | 2.21 | 69 |
| 24 | t-BMA[a] | $Cu_2O$ | 1540:1000:17.5:52 | 120 | 48,000 | 3.06 | 58 |
| 25 | IBMA | $Cu_2O$ | 1900:1000:17.5:52 | 120 | 90,700 | 1.98 | 63 |
| 26 | St | CuCl | 1090:1000:8.7:26.4 | 120 | 52,000 | 2.61 | 18 |
| 27 | St | CuBr | 1090:1000:8.7:26.4 | 120 | 61,000 | 2.05 | 10 |
| 28 | St | $Cu_2O$ | 1090:1000:17.5:52 | 120 | 75,000 | 2.72 | 70 |
| 29 | St | CuCl | 1090:1000:17.5:52 | 120 | 54,000 | 2.67 | 18 |
| 30 | St | CuBr | 1090:1000:17.5:52 | 120 | 57,000 | 2.33 | 12 |
| 31 | St | $Cu^0$ | 1090:1000:4.4:11.2 | 120 | 85,000 | 2.49 | 47 |
| 32 | St[a] | $Cu_2O$ | 1090:1000:17.5:52 | 120 | 24,000 | 6.34 | 85 |
| 33 | St[a] | CuCl | 1090:1000:17.5:52 | 120 | 38,000 | 3.45 | 15 |
| 34 | St[a] | CuBr | 1090:1000:17.5:52 | 120 | 39,000 | 3.10 | 22 |

TABLE I-continued

| Exp | Monomer | Catalyst | M/VC/Cat/bpy Mol:mru:mol:mol | Temp. (° C.) | Mn | Mw/Mn | Conversion (%) |
|---|---|---|---|---|---|---|---|
| 35 | 4-ClSt | $Cu_2O$ | 2083:1000:17.5:52 | 120 | 70,000 | 1.95 | 69 |
| 36 | 4-mSt | $Cu_2O$ | 1100:1000:17.5:52 | 120 | 108,000 | 2.15 | 59 |
| 37 | AN[b] | $Cu_2O$ | 2800:1000:8.7:12.8 | 90 | — | — | 15 |
| 38 | MAN[b] | $Cu_2O$ | 2980:1000:4.4:6.4 | 90 | — | — | 26 |
| 39 | MAN[b] | CuCl | 2980:1000:4.4:6.4 | 90 | — | — | 31 |
| 40 | MAN[b] | CuBr | 2980:1000:4.4:6.4 | 90 | — | — | 29 |
| 41 | BA | CuCl | 1740:1000:17.5:52 | 120 | 64,000 | 2.78 | 32 |
| 42 | BA[c] | $Cu_2O$ | 1740:1000:17.5:52 | 120 | 70,000 | 2.96 | 60 |
| 43 | BA[d] | $Cu_2O$ | 1740:1000:17.5:52 | 120 | 78,000 | 2.62 | 67 |
| 44 | St[e] | $Cu_2O$ | 3270:1000:17.5:52 | 120 | 210,000 | 2.07 | 77 |
| 45 | BMA[f] | $Cu_2O$ | 1570:1000:17.5:52 | 150 | 135,000 | 2.29 | 72 |
| 46 | MMA | $RuCl_2$[g] | 2340:1000:5:0 | 90 | 126,000 | 1.96 | 88 |
| 47 | MMA | $Ni(PPh_3)_2Cl_2$ | 1170:1000:17.5:0 | 90 | 90,200 | 1.86 | 36 |
| 48 | MMA[h] | CuCl | 1170:1000:17.5:52 | 90 | 85,300 | 1.98 | 23 |
| 49 | MMA[a] | $Cu_2Se$ | 1170:1000:17.5:52 | 90 | 69,200 | 2.41 | 78 |
| 50 | MMA[i] | CuCl | 1170:1000:17.5:52 | 90 | 59,700 | 1.78 | 71 |
| 51 | MMA' | CuCl | 2340:1000:17.5:52 | 90 | 95,500 | 1.65 | 85 |

Table Notations and Abbreviations:
St = Styrene
VC = Vinyl Chloride repeat unit
MMA = Methyl Methacrylate
AN = Acrylonitrile
bpy = 2,2'-bipyridyl
4-ClSt = 4-chloro styrene
MAN = Methacrylonitrile
Cat. = catalyst
BMA = Butyl Methacrylate
BA = Butylacrylate
M = Monomer
4-mSt = 4-methyl styrene
t-BMA = t-Butylmethacrylate
mru = moles of repeat unit of PVC
IBMA = IsoBornyl Methacrylate
[a] = cyclohexanone solvent
[b] = ethylene carbonate solvent
[c] = reaction time 2 hours
[d] = reaction time 4 hours
[e] = in bulk
[f] = reaction time 3 h.
[g] = $Rucl_2$(p-cymene)($PCy_3$) where p-cymene and PCy3 are 4-isopropyltoluene and tricyclohexylphosphine respectively
[h] = 1,2-dichlorobenzene solvent
[i] = Geon 110X477 (Mn = 31,800, Mw/Mn = 2.1)

It is evident from Table 1 that various monomers can be polymerized from unmodified PVC by living radical polymerization to form graft copolymers in the presence of appropriate catalysts, such that the molecular weight of the graft increases with conversion, the Mw/Mn of the graft decreases, and little or no non-grafted polymers is made.

Kinetic and Structural Characterization of the Grafts GPC Analysis

GPC analysis of the graft copolymers was performed on a Perkin-Elmer Series 10 high pressure liquid chromatograph equipped with an LC-100 column oven (40° C.), a Nelson Analytical 900 Series integrator data station, a Perkin-Elmer 785A UV/Visible Detector (254 nm), a Perkin-Elmer LC-25 RI detector and 2 AM gel (10 μm, 500 Å and 10 μm, linear 10) columns. THF (Fisher, HPLC-grade) was used as eluent at a flow rate of 1 ml/min. GPC traces of the copolymers were monomodal and shifted to higher molecular weight, indicating the absence of detectable non-grafted polymer.

To study in detail the kinetics of grafting from structural defects of PVC, a series of five Schienk tubes were charged with 500 mg PVC, 14 mg CuCl, 66 mg bpy, 1 ml MMA and 2 ml $Ph_2O$. All tubes were degassed by three freeze-vacuum pump-thaw cycles and filled with argon. The reaction mixtures were heated to 90° C. Each reaction was stopped at a different time, the conversion of MMA was determined by $^1$H-NMR and the resultant graft copolymer was dissolved in THF. A sample of this solution was injected in GPC to determine molecular weights and distribution. The results are represented in FIGS. 2 and 3 and Table 2.

Figure 2:
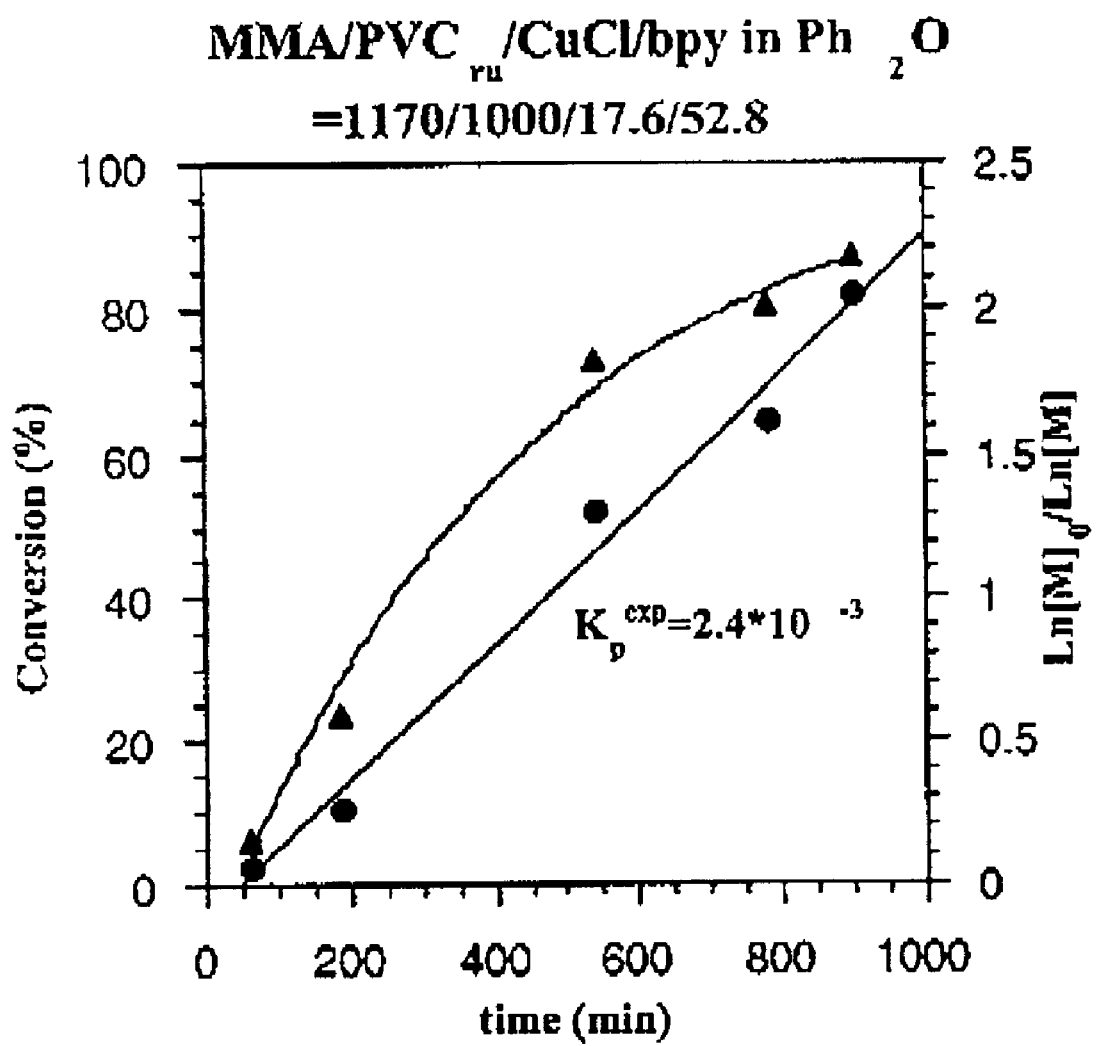
FIG. 2 is a representation of the dependence of: conversion and $ln[M]_o/[M]$ on time for the CuCl/bpy catalyzed living radical polymerization of MMA at 90° C. in $Ph_2O$ initiated from PVC, [MMA]/[VCru]/[CuCl][bpy]=1170/1000/17.5/52, [MMA]=3.1 mol/l.

As seen in FIG. 2, the grafting from structural defects of PVC is first order in monomer and the number of growing chains remains constant during the grafting process.

Figure 3:
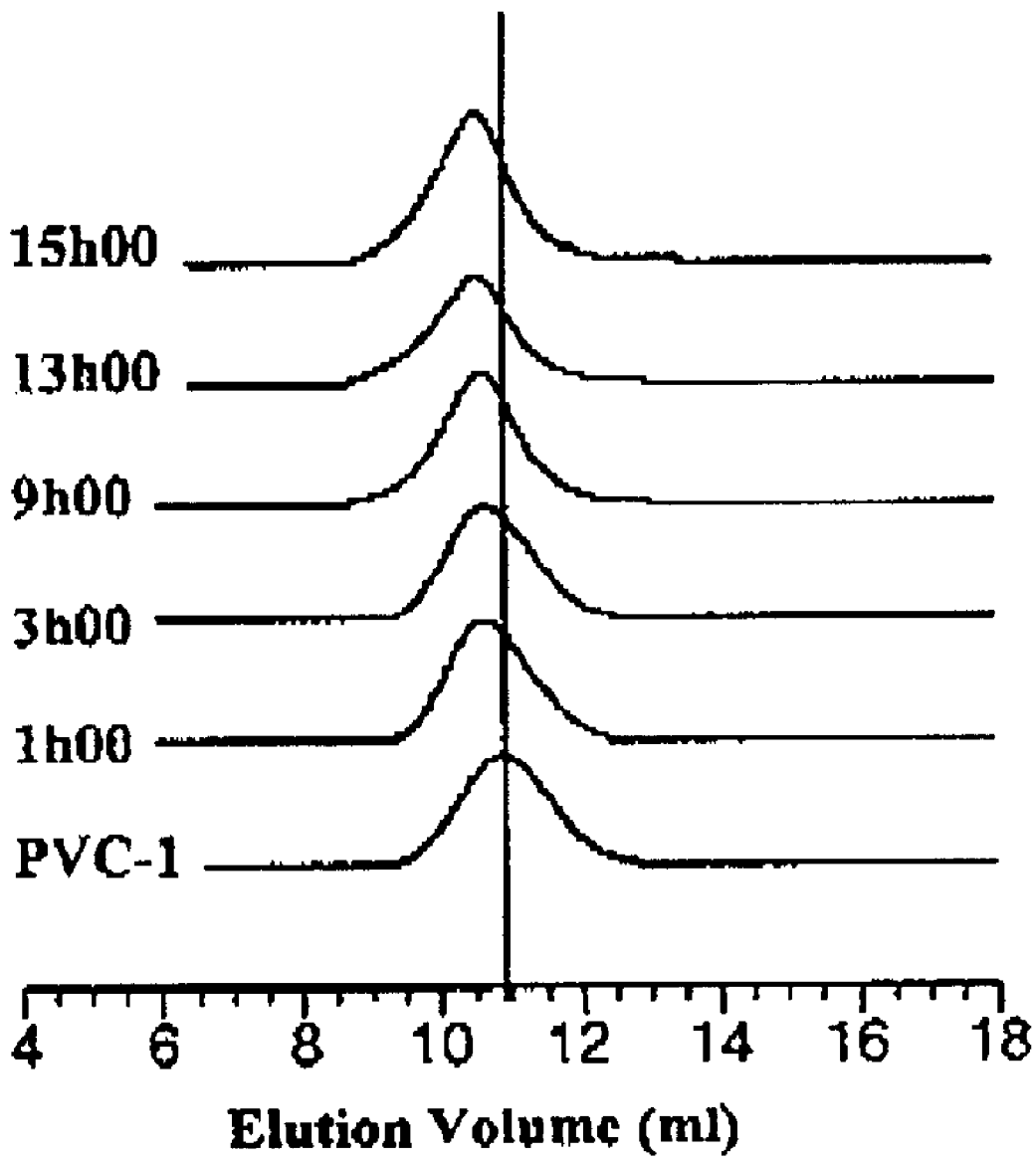
FIG. 3 is an illustration of the Evolution of GPC traces in time for the CuCl/bpy catalyzed living radical polymerization of MMA at 90° C. in $Ph_2O$ initiated from PVC, [MMA]/[VCru]/[CuCl][bpy]=1170/1000/17.5/52, [MMA]= 3.1 mol/l.
Figure 4:
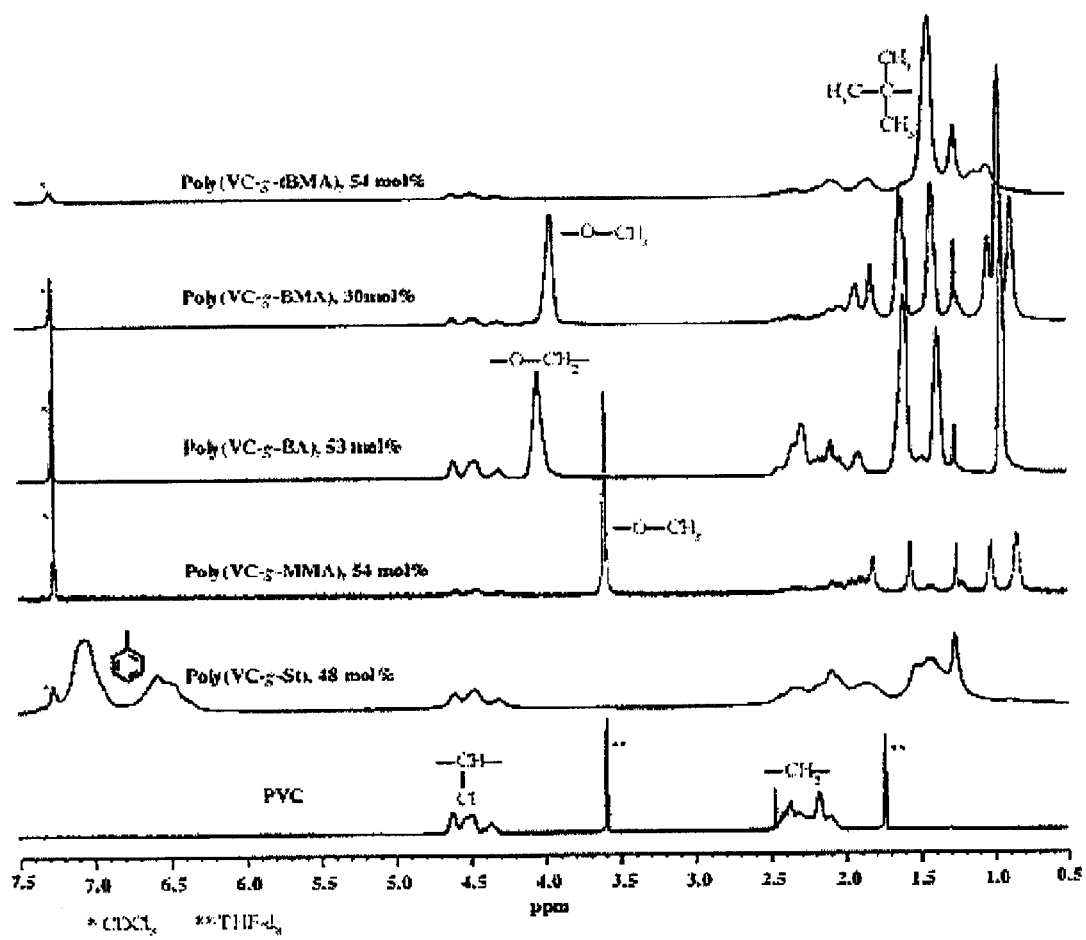
FIG. 4 is an illustration of 500 MHz $^1$H-NMR spectra of PVC in THF-d8 and of the graft copolymers in $CDCl_3$ at 25 C.

As evident from the Table 2 and FIG. 3, the molecular weight of grafted PVC increases with conversion of MMA, however this increase can not be directly related to the conversion as the original PVC has a broad molecular weight distribution. Nevertheless, the significant decrease in polydispersity of grafted PVC in conjunction with first order plot of conversion (FIG. 2) show the living character of this reaction.

TABLE 2

Kinetics of the metal catalyzed (CuCl/bpy at 90° C. in Ph$_2$O) living radical graft copolymerization of MMA initiated from the structural defects of PVC.

| Time | Conv. (%) | Mn (g/mol) | Mw/Mn |
|---|---|---|---|
| 0 | 0 | 57,000 | 2.01 |
| 1 | 6 | 73,000 | 1.89 |
| 3 | 24 | 76,000 | 1.88 |
| 9 | 73 | 102,000 | 1.73 |
| 13 | 80 | 112,000 | 1.86 |
| 15 | 87 | 115,000 | 1.76 |

Thermal Analysis

Figure 5:
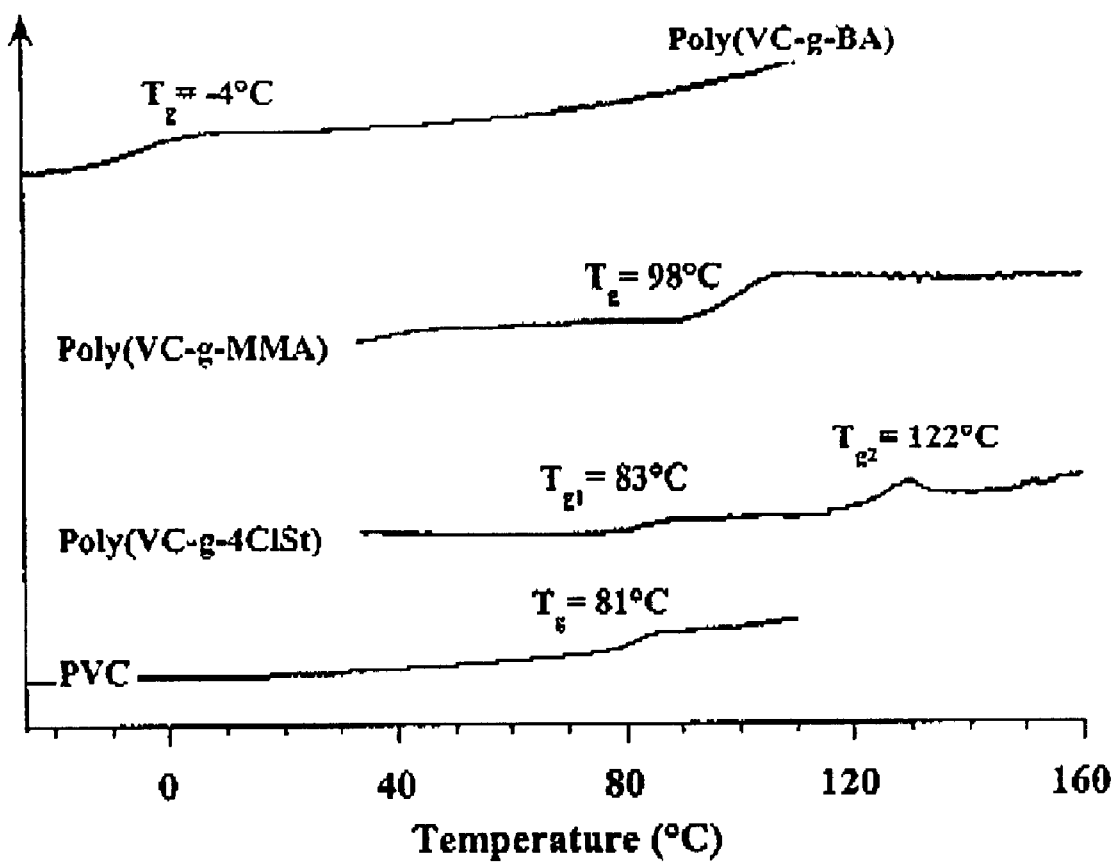
FIG. 5 is an illustration of DSC traces of PVC and poly(VC-g-BA) prepared by CuCl catalyzed living radical polymerization; reaction conditions: [BA]/[VCru]/[CuCl] [bpy]=1740/1000/17.5/52 at 120 C in Ph2O.

The differential scanning calorimetry (DSC) of the graft copolymers were recorded on a Perkin Elmer DSC-7 instrument. The DSC of poly(VC-g-BA) (Example 41 in Table 1) revealed only one Tg at −4° C. while the Tg of the original PVC was 81° C. (DSC measurement) and the Tg of PBA is −54° C. (See: Grulke, E. A. In Polymer Handbook, 2nd ed.; Brandrup, J., Immergut, E. H., Eds.; Wiley-Interscience: New York, 1975; III, p 139–192.). The calculated value of the Tg of this graft copolymer according to the Fox equation ($1/T_g=WA/T_{g,A}+WB/T_{g,B}$) is −6° C. See For example: Fukukawa, J., Handbook Of Applied Polymer Processing Technology, 1996, p 445–449. The same analysis was conducted on a poly(VC-g-MMA) sample (Example 13 in Table 1). Again, a single Tg was observed at 98° C. while the expected value from Fox equation was 95° C. (Tg of PMMA is 105° C.). These results show the absence of microphase separation in these copolymers. This is an expected result since it is well known that PVC is miscible with PMMA and depending on the molecular weight miscible with PBA. See for example: Compatibility of Polyacrylates and Polymethacrylates with Poly(vinyl chloride), Walsh, D. J.; McKeown, J. G. Polymer 1980, 21, 1330; Miscible Blends of Amorphous Polymers, Tremblay, C.; Prud'homme, R. E. J. Polymer Sci. Polymer Phys. Ed. 1984, 22, 1857. Two Tgs were observed in poly(VC-g-IBMA), i.e. one at 83° C. and the second at 122° C. This demonstrates the presence of microphase separation in this graft copolymer (Tg=119° C. for IBMA, ). These results are summarized in FIG. 5. Moreover, no macroscopic phase separation was detected from the visual inspection of the transparent films of the graft copolymers prepared from their solutions by the solvent evaporation of solvent.

EXAMPLE 1

Polymerization of methyl methacrylate was carried out in a 25 ml Schlenk tube. The tube was charged with 500 mg of polyvinyichloride (Geon 27, 0.008 mru), 20 mg of Cu$_2$O and 66.5 mg of bpy. One ml of methyl methacrylate and 2 ml of phenyl oxide were added by syringe. The tube was degassed three times by freeze-vacuum pump-thaw cycles and filled with argon. The tube was then placed in an oil bath at 90° C. After 13 hours, the reaction mixture was cooled and dissolved in THF and a sample was injected in GPC. The solution was precipitated into methanol, and after filtration the obtained graft copolymer was dried in a vacuum oven at 50° C. to constant weight. The conversion of methyl methacrylate was 78% with a number average molecular weight of 121,000 and a polydispersity of 2.45.

EXAMPLE 2

A 25 ml Schienk tube was charged with 500 mg PVC (Geon 27, 0.008 mru), 13.8 mg of CuCl, 66.5 mg bpy, 2 ml of butyl acrylate and 1 ml of diphenyl ether. The tube was degassed through three freeze-vacuum pump-thaw cycles and filled with argon. After heating at 120° C. for 13 hours, the reaction mixture was dissolved in THF and a sample was injected in GPC. The solution was then precipitated into cold methanol, and after filtration the obtained graft copolymer was dried in a vacuum oven at 50° C. to constant weight. The conversion of butyl acrylate was 32%, with a number average molecular weight of 64,000 and a polydispersity of 2.78.

EXAMPLE 3

A 25 mL Schlenk tube was charged with 500 mg PVC (Geon 27, 0.008 mru), 10 mg Cu$_2$O and 16 mg bpy. Two ml acrylonitrile and 1 ml of ethylene carbonate were added using a syringe. After three freeze-vacuum pump-thaw cycles, the Schlenk tube was filled with argon and the reaction mixture was heated at 90° C. for 13 hours. The obtained copolymer was not soluble in THF, but was soluble in dimethyl formamide (DMF). The copolymer was precipitated from DMF with methanol, and dried in a vacuum oven at 50° C. to constant weight. The conversion of acrylonitrile was 15%.

EXAMPLE 4

The following example illustrates a polymerization conducted without the use of solvent.

A 25 ml Schienk tube was charged with 500 mg PVC (Geon 27, 0.008 mru), 20 mg Cu$_2$O and 66.5 mg bpy. To the reaction mixture there was added 3 ml of styrene using a syringe. After three freeze-vacuum pump-thaw cycles, the Schlenk tube was filled with argon and the reaction mixture was heated at 120° C. for 13 hours. The resulting copolymer was solubilized in THF and a sample was injected in GPC. The solution was precipitated into methanol, and after filtration the obtained graft copolymer was dried in a vacuum oven at 50° C. to constant weight. The conversion of styrene was 77%, with a number average molecular weight of 210,000 and a polydispersity of 2.06.

EXAMPLE 5

The following example illustrates that the polymerization of the graft copolymer may be performed at or near the boiling point of the monomer/solvent mixture in an inert atmosphere.

A 25 ml Schienk tube was charged with 500 mg PVC (Geon 27, 0.008 mru), 20 mg Cu$_2$O and 66.5 mg bpy. To this mixture was added 2 ml of butyl methacrylate and 1 ml of diphenyl ether using a syringe. After three freeze-vacuum pump-thaw cycles, the Schlenk tube was filled with argon and the reaction mixture was heated at 150° C. for 3 hours. The resulting copolymer was solubilized in THF and a sample was injected in GPC. The solution was precipitated into methanol, and after filtration the obtained graft copolymer was and dried in a vacuum oven at 50° C. to constant weight. The conversion of butyl methacrylate was 72%, with a number average molecular weight of 135,000 and a polydisperisty of 2.29.

EXAMPLE 6

The following example illustrates the graft copolymerization of MMA from structural defects of PVC in the presence of Ru(II) catalyst.

Polymerization of methyl methacrylate was carried out in a 25 ml Schlenk tube. The tube was charged with 500 mg of poly(vinyl chloride) (GEON 27, 0.008 mru), 23 mg of RuCl2(p-cymene)(PCy3) (where p-cymene and PCy3 are 4-isopropyltoluene and tricyclohexylphosphine respectively). Two ml of methyl methacrylate and 1 ml of diphenyl ether were added by syringe. After three times degassing by freeze-vacuum pump-thaw cycles the Schlenk tube was filled with argon and the tube was placed in an oil bath at 90° C. After 13 hours, the reaction mixture was cooled and dissolved in THF a sample was injected in GPC and the solution was precipitated into methanol. The obtained graft copolymer was dried in a vacuum oven at 50° C. to constant weight. The conversion of methyl methacrylate was 88% with a number average molecular weight of 126,000 and a polydispersity of 1.96.

EXAMPLE 7

The following example illustrates that graft copolymerization from PVC can be conducted using any grade of commercially available PVC.

PVC (GEON 110X477, 500 mg, 0.008 mru), CuCl (13.8 mg, 0.14 mmol), bpy (65.5 mg, 0.42 mmol) were placed in a 25 ml Schlenk. MMA (2 ml, 0.94 gr, 9.3 mmol) and 1 ml of diphenyl ether were added. The tube was closed with a rubber septum and degassed three times by freeze-vacuum pump-thaw cycles and filled with argon. The tube was then placed in an oil bath at 90° C. After 13 hours, the reaction mixture was cooled and dissolved in THF, a sample was injected in GPC and the solution was precipitated into methanol. The formed copolymer was filtered and dried in a vacuum oven at 50° C. to constant weight. The conversion of methyl methacrylate was 85% with a number average molecular weight of 95,500 and a polydispersity of 1.65.

While in accordance with the Patent Statutes the best mode and preferred embodiment have been set forth, the scope of the invention is not limited thereto but rather by the scope of the claims.

What is claimed is:

1. A poly(vinyl chloride)-graft copolymer composition formed by living radical polymerization comprising said poly(vinyl chloride)-graft copolymer derived from
   a. at least one living radical polymerizable monomer or mixtures thereof; and
   b. poly(vinyl chloride);
   c. a catalyst; and
   d. optionally, a ligand.

2. A copolymer composition according to claim 1, wherein said living radical polymerizable monomer is a vinyl substituted aromatic, a nitrile, an acrylate, a methacrylate, a functional (meth)acrylate, a vinyl ester, a vinyl acetal, or an olefinic vinyl, or combinations thereof.

3. A copolymer composition according to claim 1, wherein said poly(vinyl chloride) is a homopolymer of vinyl chloride, or polyvinylidene chloride, or a copolymer derived from vinyl chloride or vinylidene chloride monomers and comonomers, or a blend of a poly(vinyl chloride) homopolymer and a copolymer, or chlorinated poly(vinyl chloride).

4. A copolymer composition according to claim 3, wherein said poly(vinyl chloride) contains at least one end-allylic, internal-allylic or tertiary labile chlorine site, said poly(vinyl chloride) having from about 1 to about 5 labile chlorine sites per 1,000 repeat units of poly(vinyl chloride).

5. A copolymer composition according to claim 1, said catalyst comprising iron, cobalt, nickel, copper, ruthenium, rhodium, palladium, and salts thereof, and wherein said catalyst is present an in amount from about 0.1 to about 50 moles per 1000 repeat units of poly(vinyl chloride).

6. A copolymer composition according to claim 2, including a transition metal catalyst, and wherein said catalyst comprises Cu(O), copper chloride, copper bromide, copper oxide, copper sulfide, copper selenide, or copper telluride, or combinations thereof; said poly(vinyl chloride) is a homopolymer of vinyl chloride, or polyvinylidene chloride, or a copolymer derived from vinyl chloride or vinylidene chloride monomers and comonomers, or a blend of a poly(vinyl chloride) homopolymer and a copolymer, or chlorinated poly(vinyl chloride); and said ligand is 2,2'-bipyridyl, 4,4' di-nonyl-2-2'-bipyridyl, terpyridyl, picolyl, N,N,N,N', N'-pentamethyidiethylenetraimine, tris(2-(dimethylamino)ethyl)amine, or cyclam, or combinations thereof, and wherein said ligand is present in an amount from about 1 to about 15 moles of ligand per mole of catalyst.

7. A copolymer composition according to claim 1, including said ligand, wherein said ligand is 2,2'-bipyridyl, 4,4' di-nonyl-2-2'-bipyridyl, terpyridyl, picolyl, N,N,N,N',N'-pentamethyidiethylenetriamine, tris(2-(dimethylamino)ethyl)amine, or cyclam, or combinations thereof, and wherein said ligand is present in an amount from about 1 to about 15 moles of ligand per mole of catalyst.

8. A copolymer composition according to claim 2, wherein said (meth)acrylate has from about 4 to about 20 carbon atoms.

9. A copolymer composition according to claim 2, wherein said living radical polymerizable monomer is present in an amount from about 25 to about 50,000 moles of monomer per 1,000 repeat units of poly(vinyl chloride).

10. A copolymer composition according to claim 3, wherein the molecular weight of an individual graft of said copolymer composition is from about 100 to about 6,000,000, and wherein said transition metal catalyst is Cu(O), copper chloride, copper bromide, copper oxide, copper sulfide, copper selenide, or copper telluride, or combinations thereof.

11. A process for making the copolymer composition of claim 1, comprising polymerizing the monomeric mixture in the presence of said transition-metal catalyst at a temperature between about 25° C. to about 200° C.

12. A compatibilizing agent, a plasticizer, an impact modifier, or a high heat distortion temperature poly(vinylchloride) containing the copolymer composition of claim 1.

13. A compatibilizing agent, an impact modifier, or a high heat distortion temperature poly(vinyl chloride) containing the copolymer of claim 4.

14. A compatibilizing agent, an impact modifier, or a high heat distortion temperature poly(vinyl chloride) containing the copolymer composition of claim 6.

15. A compatibilizing agent, an impact modifier, or a high heat distortion temperature poly(vinyl chloride) containing the copolymer composition of claim 10.

16. A process for preparing a polyvinyl chloride-graft copolymer composition comprising the steps of:
   (a) forming a mixture of a polyvinyl chloride, at least one living radically polymerizable monomer, a transition metal catalyst, and optionally a ligand; and
   (b) polymerizing said monomer from the backbone of said poly(vinyl chloride) to form said graft copolymer by a living radical process.

17. A process according to claim 16, wherein said polyvinyl chloride is a homopolymer of vinyl chloride, or a copolymer derived from vinyl chloride monomers and comonomers, or a blend of a poly(vinyl chloride) homopolymer and a copolymer, or chlorinated poly(vinyl chloride).

18. A process according to claim 17, wherein said polyvinyl chloride contains at least one end-allylic, internal-allylic or tertiary labile chlorine site, said poly(vinyl chloride) having from about 1 to about 5 labile chlorine sites per 1,000 repeat units of poly(vinyl chloride).

19. A process according to claim 16, wherein said living radically polymerizable monomer is a vinyl substituted aromatic, a nitrile, an acrylate, a methacrylate, a functional (meth)acrylate, a vinyl ester, a vinyl acetal, or an olefinic vinyl, or combinations thereof.

20. A process according to claim 19, wherein said monomer is present in an amount from about 300 to about 3,000 moles per 1,000 repeat units of poly(vinyl chloride).

21. A process according to claim 16, wherein said transition metal catalyst is iron, cobalt, nickel, copper, ruthenium, rhodium, palladium, or salts thereof, and wherein said catalyst is present in an amount from about 0.1 to about 50 moles per 1000 repeat units of poly(vinyl chloride).

22. A process according to claim 18, wherein said transition metal catalyst is Cu(O), copper chloride, copper bromide, copper oxide, copper sulfide, copper selenide, or copper telluride or combinations thereof, and said living radically polymerizable monomer is a vinyl substituted aromatic, a nitrile, an acrylate, a methacrylate, a functional (meth)acrylate, a vinyl ester, a vinyl acetal, or an olefinic vinyl, or combinations thereof.

23. A process according to claim 22, including said ligand, wherein said ligand is is 2,2'-bipyridyl, 4,4' di-nonyl-2-2'-bipyridyl, terpyridyl, picolyl, N,N,N,N',N'-pentamethyldiethylenetriamine, tris(2-(dimethylamino) ethyl)amine, or cyclam, or combinations thereof, and wherein said ligand is present in an amount from about 1 to about 15 moles of ligand per mole of catalyst.

24. A process according to claim 16, wherein said polymerization is performed in bulk.

25. A process according to claim 16, wherein said poly (vinyl chloride) is dissolved in a solvent, said solvent comprising one or more ketones, benzene derivatives, esters, and ethers, and wherein said solvent is present in an amount from about 80 to about 800 parts by weight based on the total weight of said poly(viny chloride).

26. A process according to claim 25, wherein said solvent is cyclohexanone, cyclopentanone, methyl ethyl ketone, phenyl oxide, toluene, xylene, 1,2 dichloro-benzene, ethylene carbonate, or di octyl phthalate or combinations thereof.

27. A compatibilizing agent, an impact modifier, a high heat distortion temperature poly(vinyl chloride) or a plasticizer made by the process of claim 16.

28. A compatibilizing agent, an impact modifier, a high heat distortion temperature poly(vinyl chloride) or a plasticizer made by the process of claim 17.

29. A compatibilizing agent, an impact modifier, a high heat distortion temperature poly(vinyl chloride) or a plasticizer made by the process of claim 19.

30. A compatibilizing agent, an impact modifier, a high heat distortion temperature poly(vinyl chloride) or a plasticizer made by the process of claim 21.

31. A compatibilizing agent, an impact modifier, a high heat distortion temperature poly(vinyl chloride) or a plasticizer made by the process of claim 23.

32. A composition, comprising:
the reaction product of a living radical polymerization of at least one monomer grafted from the backbone of a polyvinyl chloride in the presence of a transition metal catalyst and an optional ligand.

33. A composition according to claim 32, wherein said monomer is a vinyl substituted aromatic, a nitrile, an acrylate, a methacrylate, a functional (meth)acrylate, a vinyl ester, a vinyl acetal, or an olefinic vinyl, or combinations thereof.

34. A composition according to claim 33, wherein said monomer is present in an amount from about 300 to about 3,000 moles per 1,000 repeat units of poly(vinyl chloride).

35. A composition according to claim 32, wherein said poly(vinyl chloride) is a homopolymer of vinyl chloride, or a copolymer derived from vinyl chloride monomers and comonomers, or a blend of a poly(vinyl chloride) homopolymer and a copolymer, or chlorinated poly(vinyl chloride).

36. A composition according to claim 35, wherein said poly(vinyl chloride) contains at least one end-allylic, internal allylic or tertiary labile chlorine site, said poly(vinyl chloride) having from about 1 to about 5 labile chlorine sites per 1,000 repeat units of poly(vinyl chloride).

37. A composition according to claim 35, wherein said transition metal catalyst is iron, cobalt, nickel, copper, ruthenium, rhodium, or palladium, or salts thereof, and wherein said catalyst is present in an amount from about 0.1 to about 50 moles per 1000 repeat units of poly(vinyl chloride).

38. A composition according to claim 37, wherein said transition metal catalyst is Cu(O), copper chloride, copper bromide, copper oxide, copper sulfide, copper selenide, or copper telluride, or combinations thereof.

39. A composition according to claim 35, including said ligand, wherein said ligand is is 2,2'-bipyridyl, 4,4' di-nonyl-2-2'-bipyridyl, terpyridyl, picolyl, N,N,N,N',N'-pentamethyldiethylenetriamine, tris(2-(dimethylamino) ethyl)amine, cyclam, or combinations thereof, and wherein said ligand is present in an amount from about 1 to about 15 moles per mole of catalyst, and wherein said transition metal catalyst is Cu(O), copper chloride, copper bromide, copper oxide, copper sulfide, copper selenide, or copper telluride, or combinations thereof.

40. A compatibilizer, a high heat distortion temperature poly(vinyl chloride), a plasticizer, or an impact modifier containing the composition of claim 32.

41. A compatibilizer, a high heat distortion temperature poly(vinyl chloride), a plasticizer, or an impact modifier containing the composition of claim 33.

42. A compatibilizer, a high heat distortion temperature poly(vinyl chloride), a plasticizer, or an impact modifier containing the composition of claim 35.

43. A compatibilizer, a high heat distortion temperature poly(vinyl chloride), a plasticizer, or an impact modifier containing the composition of claim 39.

* * * * *